Sept. 30, 1958  C. J. LUCIA  2,854,265
LUBRICATED COUPLING
Filed July 31, 1953  3 Sheets-Sheet 1

INVENTOR.
CARROLL J. LUCIA
BY
Wilson and Redrow
ATTORNEYS.

Sept. 30, 1958     C. J. LUCIA     2,854,265

LUBRICATED COUPLING

Filed July 31, 1953     3 Sheets-Sheet 2

INVENTOR.
CARROLL J. LUCIA
BY
Wilson and Redrow
ATTORNEYS.

Sept. 30, 1958 C. J. LUCIA 2,854,265
LUBRICATED COUPLING
Filed July 31, 1953 3 Sheets-Sheet 3

INVENTOR.
CARROLL J. LUCIA
BY
Wilson and Redrow
ATTORNEYS.

2,854,265

LUBRICATED COUPLING

Carroll J. Lucia, Birmingham, Mich., assignor to Studebaker-Packard Corporation, a corporation of Michigan Application July 31, 1953, Serial No. 371,664

7 Claims. (Cl. 287—87)

The present application relates to a torsionally elastic coupling useful for instance, in engine-powered line drive shafting, especially slightly misaligned marine propeller shafting and the like, and having provision for internal lubrication in the coupling and a substantial capacity to transmit thrust so as to facilitate the transmission of positive and negative propeller thrusts along the general line of the shafting into relatively remote thrust bearings or into the engine.

An object in connection with the improved coupling herein disclosed, is to provide a set of dually functioning engine-powered propeller-driving ball and socket structures having interposed elastic torsion transmitting members at their periphery and enabling the same to transmit torque elastically without necessarily conducting the engine crankshaft pulsations and yet solidly at the same time transmit the propeller thrusts therethrough back in the direction of the engine.

Another objective in line with the accomplishment of the preceding object, is the provision of lubricant passages internally of the ball and socket structures and the further provision of lubricant confining seals for discriminately lubricating areas of the metallic innerfaces between the ball and socket structures with a view of not only contemporaneously transmitting thrust therethrough on freely slidable surfaces, but also to permit torsional flexibility and oscillations to occur freely due to engine impulses and to accommodate as well, some slight shaft misalignment if present.

A further object is to provide an internally lubricated coupling incorporating external elastic material for cushioned torque transmission purposes, wherein the lubricated internal surfaces in the coupling are isolated from the elastic material and the lubricant is not ordinarily exposed to nor accessible to the elastic material on which it might have deleterious effects.

According to a feature of the present invention, a pair of joined together bearing members, each presenting a confronting half-socket to the other at their adjacent ends, receives a foreshortened spheriform structure therein which between its ends is an interrupted composite of two end spherical surfaces which may or may not have the same center. At times, one spherical surface transmits push thrust in one direction and at other times, the other spherical surface transmits pull thrust or tension in the opposite direction and both surfaces are simultaneously pressure lubricated for this purpose from a common supply passage. A grease fitting is incorporated at the outer end of such passage and adapted to receive pressure lubrication from a grease gun.

An additional object of the invention is the provision of the bearing members and spheriform structure of the preceding paragraph in which the bearing portions of the spheriform structure are oppositely inclined and converge outwardly of the axis of the spheriform structure at a relatively extended radius, so as to provide circumferentially long bearing surfaces presenting relatively large bearing areas capable of withstanding substantial thrust.

A further object in connection with the spheriform structure and bearing member structure just noted, is the provision of pin-carrying lateral fingers or lugs affixed on and extending a substantial radial distance with respect to one of the structures and the provision of spaced apart elastic core means on the other which straddle the lugs and mutually receive the pins so as to divide the torque load equally therebetween; additionally, the elastic core means are at a common radius with respect to the pins carried by the lugs and radially deflect through equal angles; as presently contemplated, open centered rubber annuluses form the core means and they are disposed in two spaced apart rings transverse to the longitudinal axes of the structures with the plane of each annulus being in the plane of its own ring.

Another object is to provide a pin and elastic core means interconnection for a joint in which there is no metal to metal contact in torsion such that a quiet pulse absorbing operation results which is free from clicks and other metal to metal rattles objected to in rotating machinery.

Another object is to provide a lug and core means arrangement for torsionally connecting a two part joint in which the axes of rotation of the parts are tilted with respect to one another, wherein each lug is straddled by a pair of core means which are elastic so as to permit and accommodate the tilted axes of the parts of the joint by reason of the desirable characteristic of radial elasticity in the core means. The radial flexibility sought after is produced by rubber bodies according to the instant disclosure, which bodies permit end-wise shifting between their inner and outer peripheries and also radial shift of the inner periphery eccentrically in the plane of the outer periphery.

Further features, objects and advantages, will either be specifically pointed out or become apparent when for a better understanding of the invention, reference is made to the following written description taken in conjunction with the accompanying drawings in which:

Figure 1 is a side view of marine drive shafting showing an interposed coupling in longitudinal section;

Figures 2 and 3 are transverse views of the coupling taken along lines 2—2 and 3—3 of Figure 1;

Figure 7 is a detail showing the grease fitting employed in the couplings of Figures 1 through 6.

Figure 1:
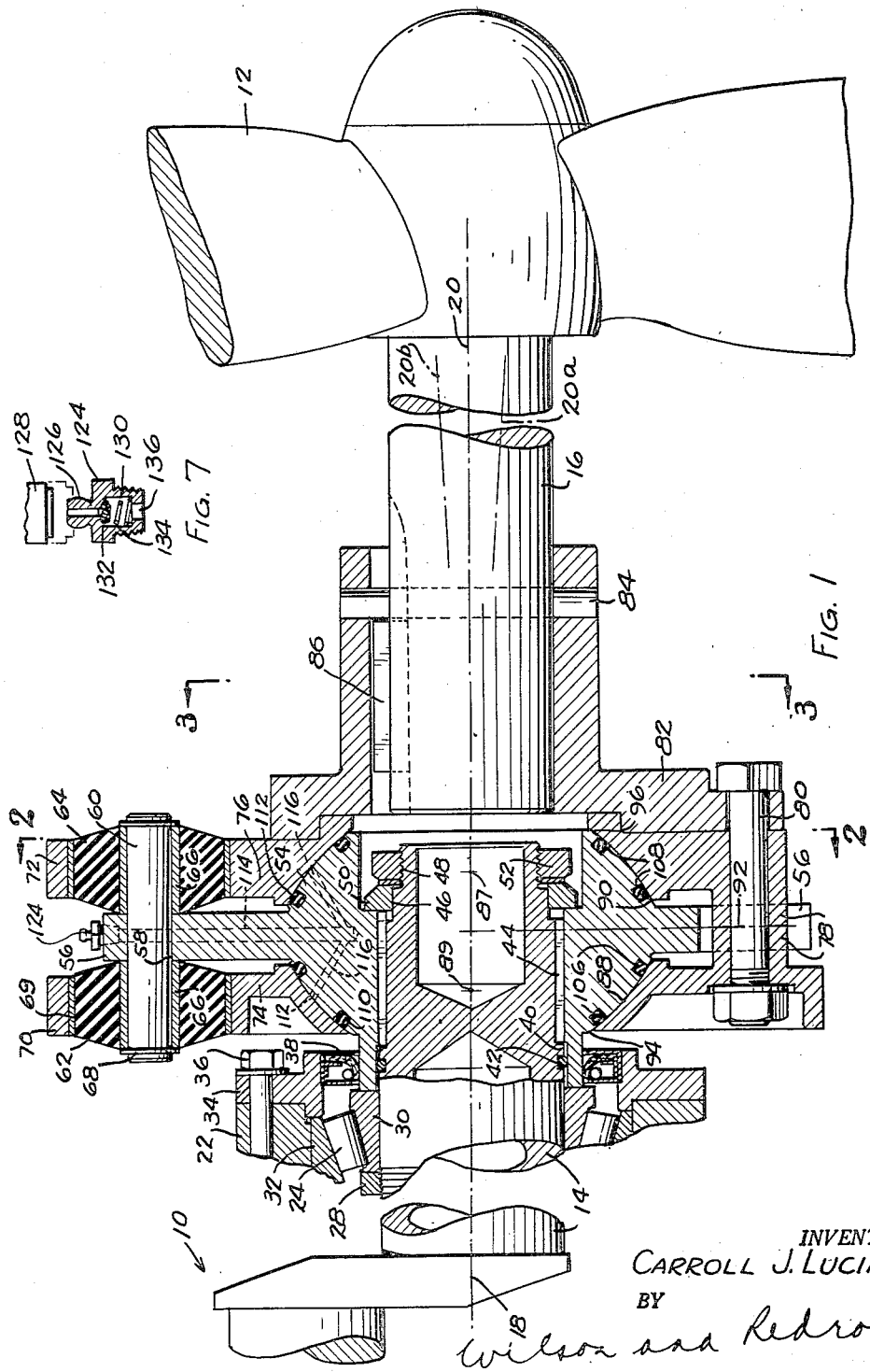
Figure 2:
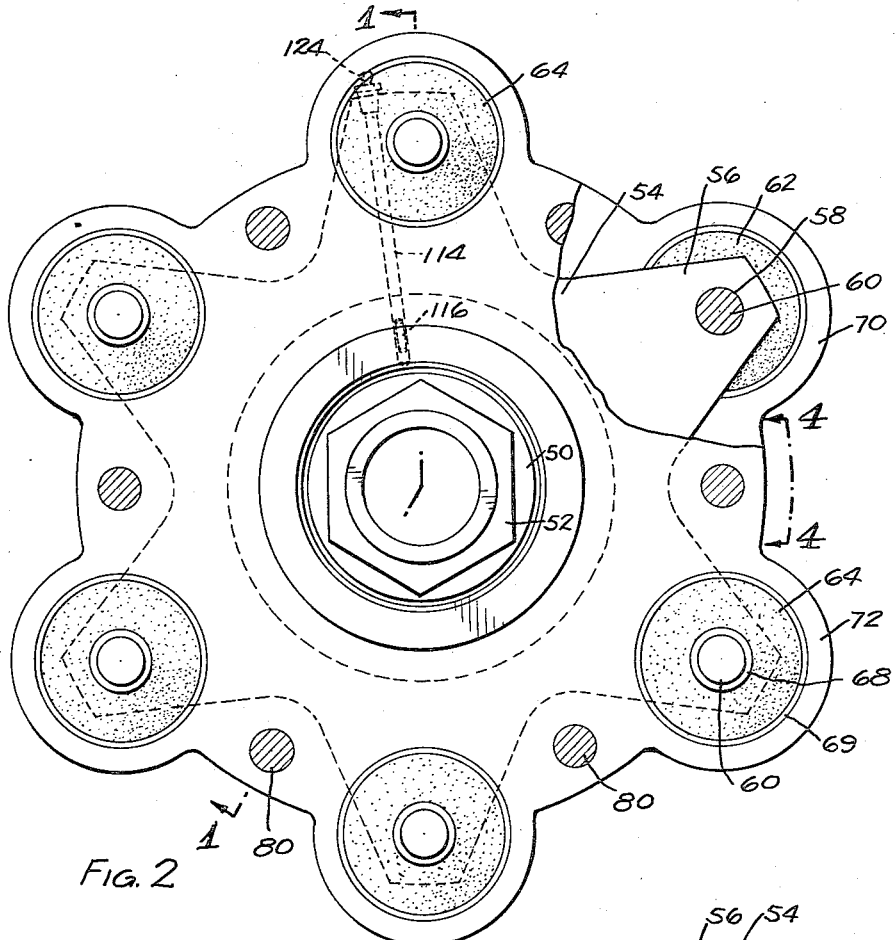
Figure 4:
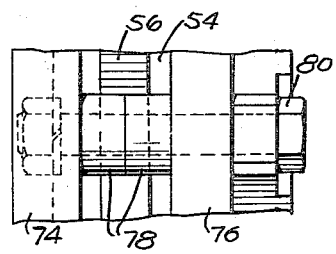
Figure 4 is a fragmentary view taken along the section lines 4—4 of Figure 2.
Figure 3:
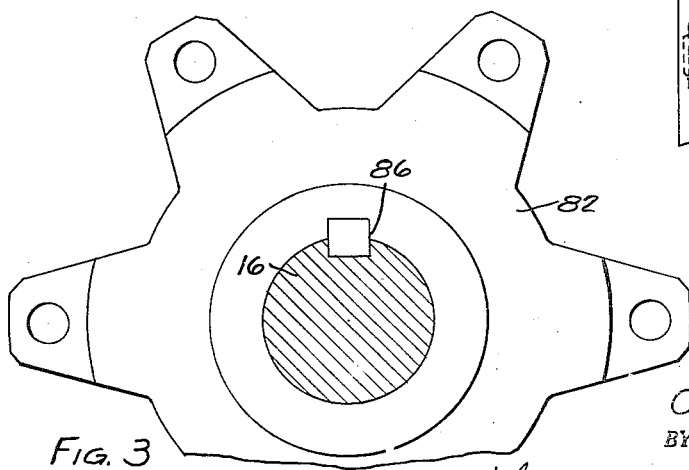

In Figures 1–4 an internal combustion marine engine 10 is shown arranged to drive a three-bladed marine propeller 12 through the intermediary of a pair of coupled-together pieces of front and rear line shafting 14, 16. The engine 10 and the front piece of shafting 14 rotate about a common longitudinal axis 18 and the rear piece of shafting 16 and the propeller 12 rotate about their central but slightly tiltable axis 20. The front shafting piece 14 is tubular and is surrounded by a shaft-like tubular thrust bearing box 22 containing a pair of spaced apart rows of thrust bearings in which the shaft 14 is journaled and one row of which is shown at 24. The front shaft piece 14 is threaded at 26 to receive a nut 28 which engages an inner race 30 for the thrust bearing 24. An outer race 32 for the bearing 24 is held in place by a seal-containing closure flange 34 which is bolted to the tubular bearing box 22 by two or more screw fasteners 36 and which has a seal 38 at its inner periphery for sealing lubricant in the thrust bearing box 22.

The front shaft piece 14 has a shoulder portion 40 which confines a lubricant retaining seal 42 at one side thereof and which has disposed at the other side a set of splines 44 extending therefrom to a reduced end 46 of the shaft 14 which is further reduced and threaded at 48. A washer 50 is received on the reduced portion 46 and is held in place by a retaining nut 52 which is threadably received on the threads 48. The splines 44 receive a set of internal splines formed in the hub of a bearing-floated and confined spheriform structure 54, which hub is engaged at one end by the thrust bearing race 30 and at the opposite end by the washer 50 so as to be held from any axial shift or rotational shift with respect to the shaft piece 14.

The spheriform structure 54 has a plurality of radiating lugs 56, of which six are shown and at least the uppermost one of which, according to the drawing, is drilled or cored out so as to provide a generally radially extending lubricating conduit. A small aperture 58 is formed in each of the lugs 56 and has a short pin 60 pressed therein in an interference fit so as rigidly to hold the latter at a mid portion thereof. Each of the lugs 56 is straddled by a pair of elastic core means 62, 64 in the form of open centered annuluses of elastomeric material such as elastic plastic, rubber, resins or artificial rubber such as neoprene and the like; the pairs of elastic core means each contain a set of inner sleeves 66 which are vulcanized or bonded thereto and receive the rigid pin 60 at its opposite ends therein. A retainer such as at 68 may be provided for holding the sleeves 66 and the pins 60 together at their ends. An outer sleeve such as at 68 is bonded or vulcanized to the circumference of the elastic core means 62 and is retained in a set of loops 70, 72 which are paired together and carried by a set of two bearing members 74, 76.

In alternation with the loops 70, 72 carried thereby, the bearing members present pairs of registered mutually engaging bosses 78 (Figure 4) fastened together by a corresponding number of bolts 80 which also pass through a star shaped hub 82 which is pinned at 84 and keyed fast at 86 to the rear shaft piece 16.

Provision is made whereby the bearing members 74, 76 and the hub structure 82 which as a unit are axially and rotatably fast to the shaft piece 16, may be tilted through a slight angle with the latter as the axis 20 thereof deflects from the mid position shown to a position of lower tilt 20A or to a position of upper tilt as at 20B according to the exaggerated showing of Figure 1. To this end, the bearing members 74, 76 are socketed to provide a pair of interrupted composite surfaces respectively at 88 and 90 lying in spheres whose corresponding centers 87 and 89 are in the axes 18, 20 at the extreme opposite sides of a transverse plane 92 mid way between the adjacent ends of the bearing members 74, 76. The radii of generation of the surfaces 88, 90 from centers 87, 89 may be dissimilar, but are shown preferably to be equal to one another such that the centers 87, 89 are equidistant from the transverse mid plane 92. The spheriform structure 54 which is rotationally coaxial with the engine 10 and shaft piece 14 so as to have in common therewith the axis 18, has a pair of oppositely inclined bearing portions 94, 96 which are complementary to the surfaces 88, 90 and which converge outwardly of the axis 18 in the radial direction of the lugs 56. Though the composite surfaces 88, 90 to which the bearing portions 94, 96 are complemental, do not lie in a common sphere, a slight tilting motion of interfaced engagement is permitted, for instance, as about the respective centers 87, 89 during tilt of the rear shaft piece 16 from the position 20 of its longitudinal axis toward the exaggerated upper and lower positions 20A, 20B.

During appropriate rotation of the propeller 12 for rearward drive propulsion of the marine craft to which it is fitted, a negative thrust or tension is imposed on the flexible coupling so as to load the surfaces 88, 94 in compression and to cause whatever tilting action which occurs to transpire about the sphere mid point 87 as a center. Conversely, when the propeller 12 is driven in a direction of rotation to cause the marine craft to be propelled forwardly, the surfaces 96, 90 at the opposite end of the spheriform structure 54 are loaded in compression and any slight amount of tilting permitted transpires about the sphere mid point 89 as a center.

Figure 5:
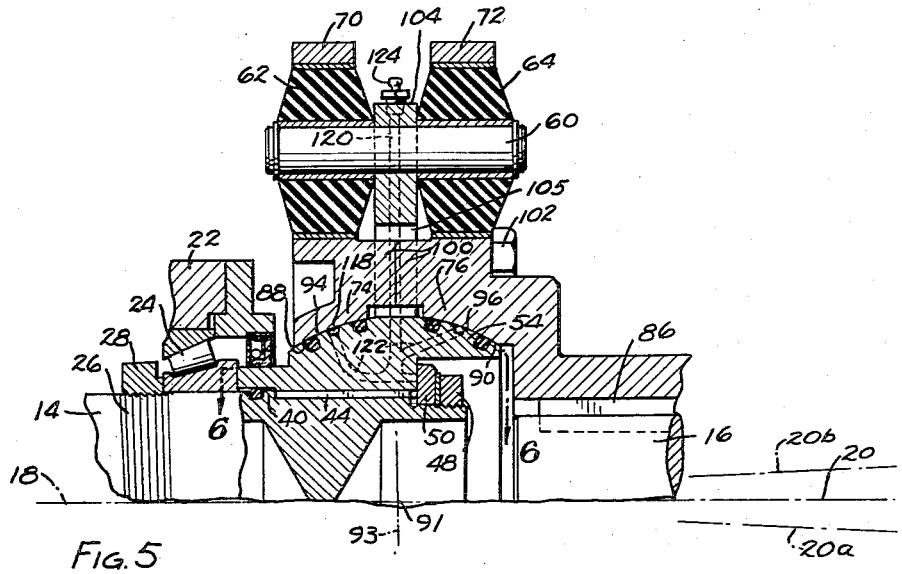
Figures 5 and 6 are longitudinal sectional and full face views of a modified form of the coupling.
Figure 6:
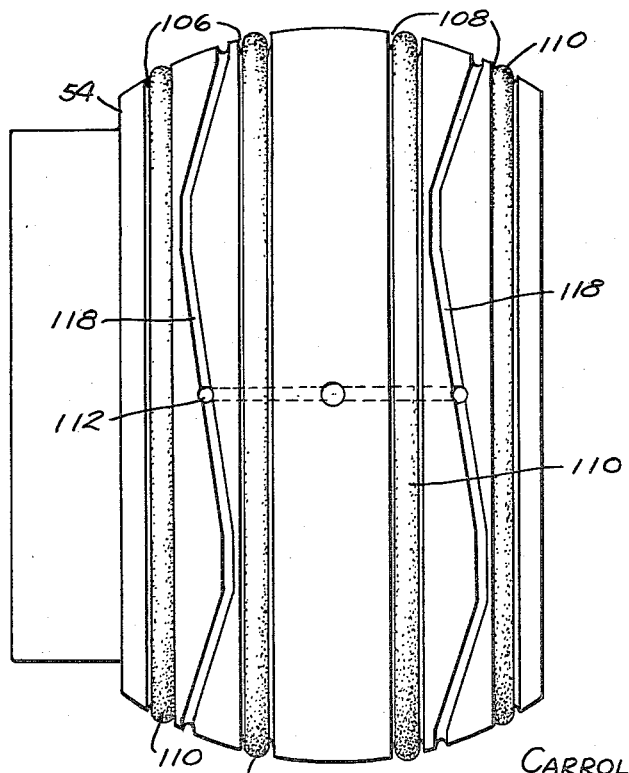

In a modification of the invention shown in Figures 5 and 6, a similarly engine-powered propeller-driving series of front and rear shaft pieces 14, 16 is coupled together so as to permit relative tilt between their respective axes 18, 20 to an extent greatly exaggerated in Figure 5, wherein the longitudinal axis 20 of the rear shaft piece 16 may approach the lower position 20A or the upper position of tilt 20B. A thrust bearing 24 contained in a shaft-like tubular part 22 has a race 30 held between a pair of retainer nuts 28, 48 in end-to-end compression against a spheriform structure 54 forming an inner part of the coupling.

The spheriform structure 54 is splined to a set of splines 44 provided on the shaft piece 14 similarly to the splines of like numeral in the embodiment of Figures 1–4. Forming an outer part for the coupling, a pair of bearing members 74, 76 in Figure 5 is provided which have their adjacent ends forming an interrupted composite surface 88, 90 constructed to lie in a common sphere having a center 91 which is at the point of intersection of the axes 18, 20 at its location in a transverse plane at 91 midway between the adjacent ends of the bearing members 74, 76. The radii of generation of the respective surfaces 88, 90 from the center 91 may be dissimilar, but preferably are equal to one another because of certain conveniences of manufacture inhering in the employment of the just-termed common sphere type construction. The rear bearing member 76 is keyed at 86 and pinned, though not shown, to the rear shaft piece 16 so as to be rotationally and axially fast thereto. The bearing members 74, 76 each carry a row of loops 70 or 72, preferably six in number, which in transverse alignment therewith carry a pair of registering mutually engaging bosses 100 which are coaxially apertured so as to receive a bolt 102 for fastening together the bearing members 74, 76 through each set of coaxial apertures. The inner spheriform structure 54 carries a row of radiating lugs 104 of a number corresponding to the loops 70 and 72 and each lug has a pair of legs, one of which is indicated at 105, which straddle the bosses 100, one at each circumferential side thereof. A lubricating conduit extending generally radially through the leg 105 of the illustrative lug 104 is shown at the top of Figure 5.

During rotation of the shaft piece 16 in a direction for either forward or rearward drive of the marine craft, the axis of tilt of the shaft piece 16 occurs substantially at the mid point of the sphere 91 as a center. Similarly to the preceding embodiment, the embodiment of Figures 5 and 6 is arranged such that the spheriform structure 54 comprises an axially short journal having oppositely inclined bearing portions 94, 96 which are loaded alternatively under reverse drive of the shaft piece 16 and under forward drive of the shaft piece 16 in propelling a marine craft.

In both the form of the invention of Figure 1 and the form of Figure 5, the metallic interfaces 88 and 94 and 90, 96 are desirably lubricated and to this end these interfaces are relatively relieved in both forms to provide means for receiving lubricant seals and in addition in the form of Figures 5 and 6, the metallic interfaces are relatively relieved to provide means for uniformly distributing the lubricant across the metallic interfaces.

Illustrative of the means for receiving the lubricant seals are the pairs of grooves 106, 108 formed in the surface of the spheriform structure toward its ends and being circularly continuous and arranged about the periphery thereof such that each groove of any one pair is disposed in a plane parallel to and spaced apart with respect to the other groove of the pair. In the grooves 106, 108 are received deformable O-rings 110 of circular cross-section and formed of suitable lubricant resistant rubber or other elastomeric material so as not to deteriorate in service. So situate, the O-rings 110 are disposed such that the planes of the rings are spaced apart and a predetermined confined area is defined for a film of lubricant between the metallic interfaces. In the form of the invention at Figure 1 intermediate the limits defined by the seals 110, a pair of ports 112 is formed in the outer surface of the inner spheriform structure 54 and is supplied with grease from a previously referred to lubricant conduit or common supply passage indicated at 114 which intersects at about 45° angles with a pair of branch passages 116 providing split paths leading to the ports 112 for distributing grease to the metallic interfaces respectively at 88, 94 and 90, 96.

Illustrative of the means for distributing lubricant uniformly across the metallic interfaces, a zig-zag groove 118 is shown formed in each end surface of the structure 54 in the embodiment of Figures 5 and 6 which thereby provides a grease distributing passage that zig-zags to and fro in spaced relation at all points between the end limit defining seals 110 and are each circumferentially continuous about the outer surface of the inner spheriform structure 54. A port 112 in the bottom of each passage 118 provides a substantially right angled intersection therewith to a grease passage having a common supply portion 120 and a pair of split path branch portions 122.

The outer end of the common supply portion 120 in the embodiment of Figure 5 and the common supply passage 114 in the embodiment of Figure 1 is counter-bored to receive a pressure lubricating or zerk fitting 124 shown in detail in Figure 7. The fitting 124 has an outside nipple 126 adapting the same to receive a grease pressure gun 128 and internally thereof has a valve receiving interior chamber 130 for receiving a check valve 132 which is spring loaded at 134 to prevent reverse seepage of grease or other lubrication due to centrifugal forces involved in the operation of the two embodiments of the couplings. A central passage 136 formed in the fitting 124 communicatively connects the nipple 126 and the check valve 132 and also connects the check valve 132 with the longitudinal passages formed in the lugs 56, 104 of the forms of the invention of Figures 1 and 5.

In both forms of the invention, the incorporation of the tubular thrust bearing 22 in adjacency to the coupling parts is optional and in the alternative the thrust may be taken up either at the engine 10 or at a more remote thrust bearing location than is presently shown at 24. It is to be noted that the embodiment of Figure 1 is arranged such that the thrust transmitting lubricated surfaces in the coupling have considerably more of a transverse component of area than the surfaces in the embodiment of Figure 5 and hence, a slightly more advantageous bearing capacity is provided in the former. However, the embodiment of Figure 5 is perhaps a little better suited to easy machining and gauging during the manufacturing operation, owing to the fact that the composite spherical surfaces 88 and 90 and other surfaces conform to a common center 91 and a common radius of generation. It is apparent that the lubricating passage means which are internal to the spheriform structures 54 of Figures 1 and 5 may be machined or cored therein as most expedient.

As herein disclosed, the zig-zag grease distributing passages are shown to be present only in the form of Figures 5 and 6 in which the oppositely inclining half-sockets on the bearing portions are spherically concentric and symmetrical. It is evident that the zig-zag grease distributing passage may be used on the form of the invention of Figure 1 and may be of other form than zig-zag so long as they each are circularly communicatively continuous around the periphery of the inner spheriform structure; in a broad sense, moreover, such passages 118 may be relocated and formed on the inner periphery of the respective bearing members 74, 76 and likewise, the circular sealing grooves 106, 108 may be so located irrespective of which part has the passages 118 formed thereon. So also the drawing shows only one lug 56, 104 on the separate embodiments to be provided with generally radially extending lubricant conduits having a grease fitting therein, but self-evidently two or more lugs in the row of lugs may include passage means and grease pressure fittings at their outer ends to permit pressure lubrication of the coupling from any angle of repose of the coupled shafts without necessitating jacking over of the engine 10 until the particular lug and grease fitting to the coupling is exposed for access thereto by a pressure grease gun. According to both embodiments, the pin carrying lugs 56, 104 are straddled by two core means, one on each side thereof, so as elastically to receive the pin but indeed, it is not essential to the invention that only two core means be used and it may be found desirable in certain installations to use pairs of two or more core means straddling the pins 60 and in a broader sense, a single ring of core means at only one side of the pin may be found to produce satisfactory results of operation.

For convenience in the description, the front and rear shaft pieces 14, 16 are described as having relative tilt in directions upwardly and downwardly with respect to one another, but lateral tilting is also accommodated to the same advantage by the coupling means of the present disclosure.

Variations within the spirit and scope of the invention described are equally comprehended by the foregoing description.

What is claimed is:

1. A universal joint for transmitting tension and thrust from a first shaft arranged end to end with a second shaft, comprising a short journal secured to one of the shafts having oppositely inclined arcuate bearing portions converging outwardly of the axis of the shaft, a juxtaposed pair of annular bearing members secured to the other shaft and engaging said portions, the adjacent ends of said members being formed to provide a composite spherical surface, a row of apertured radiating torque transmitting lugs on said journal, means through which pressure lubrication is introduced to said composite surface including a common passage in at least one of said lugs and resilient means for securing said annular bearing members to said lugs.

2. A universal joint for transmitting tension and thrust from a first shaft arranged end to end with a second shaft, comprising a short journal secured to the first shaft having oppositely inclined arcuate bearing surfaces thereon, a juxtaposed pair of annular bearing members secured to the second shaft and engaging said bearing surfaces, the adjacent ends of said members being formed to provide a composite spherical thrust bearing surface, a laterally extending lug on said journal, and means through which pressure lubrication is introduced to said composite surface including a common radial passage in said lug, resilient means connecting said lug with said bearing members so as to provide for the transmission of torque one to the other.

3. A universal joint comprising a short journal having oppositely inclined arcuate bearing surfaces thereon, a juxtaposed pair of annular bearing members engaging said bearing surfaces, means detachably securing said members together, the adjacent ends of said members being formed to provide a two-part composite spherical thrust bearing surface, a row of radiating lugs on said journal, and means having a common portion through which pressure lubrication is introduced to said two-part composite surface and of which the common portion is included in at least one of said lugs, resilient means connecting said lug with said bearing members so as to provide for the transmission of torque one to the other.

4. A universal joint for transmitting tension and thrust comprising a short journal having oppositely inclined arcuate bearing portions converging outwardly of the axis of the journal, a juxtaposed pair of annular bearing members engaging said portions, means for detachably connecting said members together, the adjacent ends of said members being formed to provide a composite surface lying in spheres whose centers are in the axis of said journal at the extreme opposite sides of a plane midway between said adjacent ends, a row of apertured radiating lugs on said journal disposed on the just-named plane, means through which pressure lubrication is introduced to said composite surface including a common supply passage extending longitudinally through at least one of said lugs, resilient means connecting said lug with said bearing members so as to provide for the transmission of torque one to the other.

5. A lubricated bipartite ball and socket joint having its parts one within the other with an arcuate outer surface of the inner part and the juxtaposed complementary surface of the outer part being relatively relieved to provide spaced apart sealed receiving grooves, seals in said relieved portions to defined end limits for a film of lubricant between the interfaces of the parts, a torque transmitting lug on said inner part, said lug being resiliently joined to said outer part for the transmission of torque from one part to the other part, and conduit means in said parts through which lubricant is introduced between said interfaces including intersecting passages one communicating with the interfaces and the other having a counterbored portion in said lug to receive a lubricant pressure fitting.

6. A lubricated bipartite ball and socket joint having its parts one within the other with the arcuate outer surface of the inner part and the juxtaposed complementary surface of the outer part being relatively relieved to provide spaced apart seal receiving grooves, seals in said relieved portions to defined end limits for a film of lubricant between the interfaces of the parts, radiating lugs on said inner part resiliently connected to said outer part for the transmission of torque one to the other, conduit means including passageways for the introduction of lubricant between said interfaces including intersecting passages one being a zig-zag passage communicating with the interfaces and disposed between said seals, and the other being a conduit in one of said lugs counterbored at the tip portion thereof to receive a lubricant pressure fitting.

7. A lubricated bipartite ball and socket joint having its parts one within the other with the arcuate outer surface of the inner part and the juxtaposed complementary surface of the outer part being relatively relieved to provide sets of grooves, double set of seal receiving grooves and seals in said grooves to defined end limits for a film of lubricant between the interfaces of said parts, annular set of lubricant receiving grooves disposed between said seal receiving grooves, a plurality of lugs carried by said inner part resiliently connected to said outer part for the transmission of torque one part to the other, means through which lubricant is supplied to the lubricant receiving grooves for introduction between said interfaces including radial conduit means in one of said lugs.

References Cited in the file of this patent

UNITED STATES PATENTS

| | | |
|---|---|---|
| 1,300,023 | Riegel | Apr. 8, 1919 |
| 1,358,267 | Volk | Nov. 9, 1920 |
| 1,488,291 | Schell | Mar. 25, 1924 |
| 1,585,631 | Heinrich | May 18, 1926 |
| 1,996,994 | Grubb | Apr. 9, 1935 |
| 2,077,582 | Peo | Apr. 20, 1937 |
| 2,145,532 | Standage | Jan. 31, 1939 |
| 2,189,598 | Brecht | Feb. 6, 1940 |
| 2,211,817 | Hufferd et al. | Aug. 20, 1940 |
| 2,250,123 | Boehm | July 22, 1941 |
| 2,421,691 | Gibson et al. | June 13, 1947 |
| 2,523,367 | Holt | Sept. 26, 1950 |
| 2,655,014 | Walker | Oct. 13, 1953 |

FOREIGN PATENTS

| | | |
|---|---|---|
| 252,200 | Switzerland | Sept. 16, 1948 |

UNITED STATES PATENT OFFICE
CERTIFICATE OF CORRECTION

Patent No. 2,854,265                                                        September 30, 1958

Carroll J. Lucia

It is hereby certified that error appears in the printed specification of the above numbered patent requiring correction and that the said Letters Patent should read as corrected below.

Column 6, line 31, for "shart" read -- shaft --.

Signed and sealed this 9th day of December 1958.

(SEAL)
Attest:

KARL H. AXLINE                                                  ROBERT C. WATSON

Attesting Officer                                               Commissioner of Patents